Nov. 4, 1924.
E. L. SCHUMACHER
LENS STRAP
Filed April 14, 1922
1,513,789
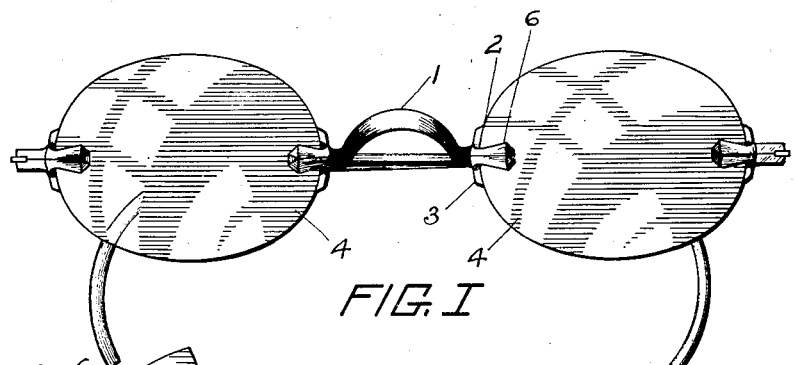
FIG. I
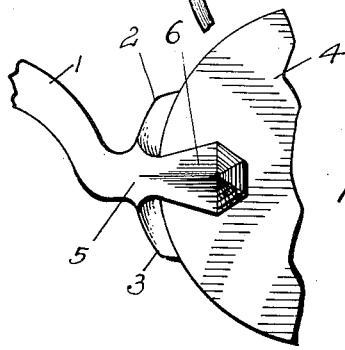
FIG. II
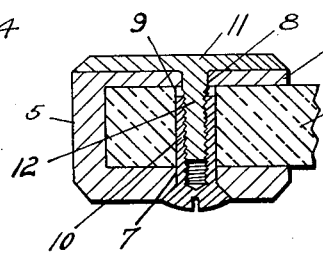
FIG. III
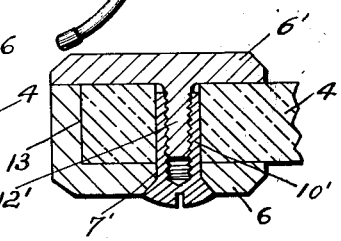
FIG. IV
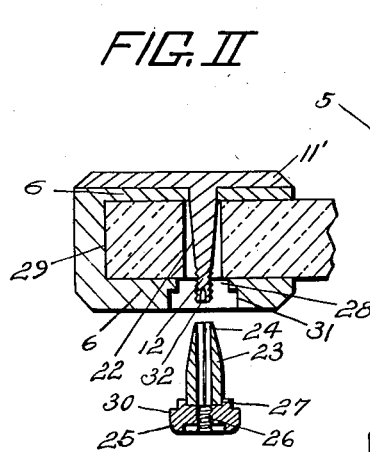
FIG. VII
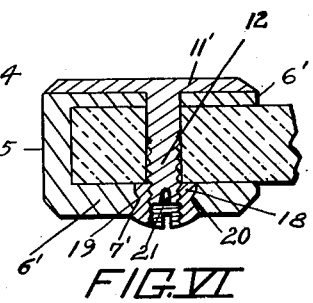
FIG. V    FIG. VI
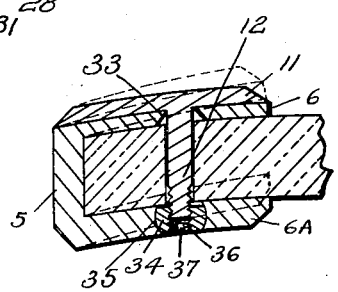
FIG. VIII
INVENTOR
ELMER L. SCHUMACHER
BY
H. H. Styll & H. K. Parsons
ATTORNEYS Patented Nov. 4, 1924.

1,513,789

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS STRAP.

Application filed April 14, 1922. Serial No. 552,626.

*To all whom it may concern:*

Be it known that I, ELMER L. SCHUMACHER, a citizen of the United States, residing at Southbridge, in the county of Worcester and State of Massachusetts, have invented certain new and useful Improvements in Lens Straps, of which the following is a specification.

This invention relates to new and useful improvements in eye glass mountings and more particularly to the construction and application of the lens strap which is used to secure the temples and nose bridge to the lens by clamping jaws which are arranged upon opposite faces of the lens and securely connected thereto.

The main object of the invention is the provision of a lens strap adapted to be quickly and readily attached to the lens and wherein the fastening means will be invisible from one side of the lens, especially the front so that the mounting or strap will have the appearance of a mounting which is cemented or otherwise secured to the lens.

A further object of the present invention is the provision of a lens strap including in its construction spaced ears adapted to be arranged upon opposite sides of a lens with co-operating attaching means carried by said ears and securing the strap in position upon the lens and in attaching thereto suitable means for locking the relative parts in attached relation.

A further object of the present invention is the provision of a lens strap including spaced ears adapted to be arranged upon opposite sides of a lens and means carried by one of the ears whereby to assist in clamping the lens in position when utilizing the fastening means for connecting the strap onto the lens.

With the above and other objects in view the invention consists in the novel features of construction, the combination and arrangement of parts hereinafter more fully set forth, pointed out in the claim and shown in the accompanying drawings, in which—

Figure I is a front elevation of a spectacle mounting constructed in accordance with my invention.

Figure II is an enlarged fragmentary view of a lens and part of the mounting exposed on the front of the lens.

Figure III is a longitudinal sectional view taken through the mounting.

Figure IV is a similar view illustrating a slightly modified form of the invention.

Figure V is a similar view illustrating another form of the invention.

Figure VI is a longitudinal sectional view illustrating another form of the invention.

Figure VII is a longitudinal section of a lens strap illustrating another form of the invention.

Figure VIII is a longitudinal section of a lens strap illustrating another form of the invention.

The improved lens strap which is set forth herein and clearly illustrated in the accompanying drawings is adapted for use on the lens and connected to the temple stud or to the nose or bridge piece of a rimless eye glass mounting and regardless of which part of the mounting the improved strap is attached to it involves the same general construction throughout.

In the accompanying drawings, 1 indicates the nose piece or bridge the ends of which are provided with diametrically opposite segmental lens engaging fingers 2 and 3 which are adapted to fit tightly against the perimeter of the lens 4. Extending from opposite sides of the back piece 5 which includes the ends 2 and 3 are the lens engaging straps 6, which are disposed upon opposite sides of the lens whereby to clamp the lens between them.

In view of the fact that one of the main objects of the invention is the provision of means whereby to securely fasten the straps in position upon opposite faces of the lens, and at the same time eliminate the visibility of the fastening means from one face of the lens, one of the straps 6 is provided with an opening 7, which is disposed in alignment with the opening 8 formed in the opposite strap. After the lens 4 has been positioned between the straps 6 with the opening 9 in the lens in alignment with the openings 7 and 8, an internally threaded sleeve 10 is inserted into the opening in the lens through the opening 7 in one of the straps 6. The sleeve 10 is preferably of a size to fit tightly within the lens opening to prevent any movement on the part of the lens after the sleeve has been fitted within the opening and secured in its operative position.

In order to retain the sleeve 10 in its proper relative position a supplemental plate 11 is provided having formed upon one face thereof a threaded stud 12 which is extended through the opening 8 and threaded into the sleeve 10. It will be noted that by forming the stud 12 upon the inner face of the plate 11 and then positioning the plate 11 upon the exterior of the strap, the fastening means will be invisible on this side of the strap. The stud 12 as set forth above is fitted into the end of the sleeve 10 and by rotating the sleeve 10 the two parts of the strap will be brought tightly against the opposed faces of the lens and as the outer end of the sleeve 10 is partly countersunk, as shown in Fig. III, it will produce a smooth and comparatively even surface of this side of the lens which will provide a rimless mounting of neat appearance.

In Figure IV there is illustrated a slightly modified form of the invention wherein the plate 11 shown in Figure III is eliminated and the stud 12' is attached directly to the inner face of the lens strap 6'. The strap 6' is formed separately from the strap 6 and has one end bearing against the annular portion 13 of the member 6 so that when the strap in its entirety is attached to a lens, the member 6 is fitted against the lens with the portion 13 abutting the perimeter of the lens and the bearing sleeve 10' is then fitted into the opening 7' of the member 6 and extended into the opening in the lens. The plate 6' is arranged over the face of the lens opposite the member 6, the stud 12' threading into the bearing sleeve 10' until the two opposed members 6 and 6' are brought into close contact with the opposite faces of the lens.

After the sleeve 10' has been fitted rotatably in one of the ears and passed through the lens and operatively engaged with the stud 12', a suitable tool may be used to engage the kerf in one end of the sleeve, so that it may be rotated for tightening the opposed parts of the strap in attached relation against opposite faces of the lens.

In Figure V there is disclosed another form of the invention wherein the stud 14 is formed integral with the under face of a plate 15. This plate 15 is comparatively thin and rests within a recess 16 formed in the outer face of the strap 17. When the sleeve 10' is placed in position within the lens opening the stud 14 will be fitted into the end of the sleeve 10' and by turning the sleeve the stud 14 will be drawn into the sleeve and the plate 15 seated within the recess 16. The plate 15 is of a size to fit within the recess 16 so that the edges of the plate and the walls of the recess will be rendered invisible as nearly as possible.

In Figure VI another form of the invention is disclosed wherein in place of using the sleeve 10 and 10', as in the other forms of the invention, a nut 18 is used having its exterior provided with an annular groove 19 receiving the annular rib 20 formed within the opening 7' in the strap portion 6'. From this it will be apparent that the nut 18 can be readily forced into the opening 7' and while permitting rotation of the nut it will eliminate any movement of the nut laterally within the opening 7'.

In this form of the invention the plate 11' is used although the stud 12 can be formed on the strap 6', as shown in Figure IV, if found desirable. The stud 12 has its outer end threaded into the nut 18, whereby turning movement of the nut will tend to draw the two sides of the strap against the opposed faces of the lens.

In this form of the invention the end of the stud 12 is provided with a central bore 21 for the reception of a sharp pointed instrument to force the walls of the bore and portions of the stud into engagement with the nut 18, to prevent turning movement on the part of the nut.

In Figure VII there is disclosed another form of the invention wherein the plate 11' carries the stud 12, which is tapered as at 22, its greatest diameter being adjacent the plate 11'.

In this form of the invention a bearing sleeve 23 is formed of a non-metallic composition one end of which is provided with a tapering portion 24 fitting onto the tapering portion 22 as shown in Figure VII.

In order to retain the sleeve 23 in position upon the stud 12 and within the lens opening the nut 25 is provided having a central threaded opening 26 and further provided with an annular socket 27 to receive one end of the sleeve 23. From this it will be apparent that after a lens has been positioned between two strap members 6 the sleeve 23 is arranged within the lens opening and the nut 25 positioned within the opening 28. The stud 12 is then inserted from the opposite face of the lens, passing the stud down through the sleeve 23 until the threaded end of the stud engages with the threaded opening 26 whereby turning movement on the part of the nut 25 will bring the two opposed members together, the tapering end 24 of the sleeve 23 being spread apart by means of the tapered portion 22 so as to force the walls of the sleeve 23 into contact with the wall of the opening in the lens. By using the tapered portion 22, should the opening in the lens be slightly to one side from what it ordinarily should be, the spreading of the walls of the sleeve 23 will tend to correct the position of the lens and force the perimeter against the cross piece 29. The nut 25 is provided with a flange 30 to seat within the recess 31 in the strap 6 to bring the outer end of the nut flush with the outer face of the strap.

The stud 12, in this form of the invention, is provided with a drilled recess 32 so that after the nut 25 has been screwed tightly into position the end of the stud 12 can be spread sufficient to lock the nut 25 in position upon the stud and thus preventing removal of the nut or parts depending thereon.

In placing the sleeve 23 in position it is preferred to heat this composition material to a certain temperature so that it may be substantially pliable or plastic so that when the parts are drawn together the wedge shaped or tapering portions 22 and 24 will co-operate to force the part 24 against the inner walls of the opening in the lens which is essential in securing the lens in its proper position.

In Figure VIII there is disclosed another form of the invention which is particularly for attachment to curved lenses. In this form of the invention the stud 12 is carried by the plate 11 and extended through an opening in one of the side straps, said opening having divergent side walls 33 to permit universal movement on the part of the stud 12. In this form of the invention the nut 34 is provided with a convex surface adapted to be fitted into the arcuate shaped recesses 35 formed within the opening which extends through the strap member 6^A. The nut 34 is adapted to receive the end of the stud 12 so that upon turning the nut 34 the stud 12 will be drawn toward the nut bringing the two clamping straps into close engagement with the opposed faces of the lens. In order to manipulate the nut 34 a transverse recess is formed in the end of the nut as at 37 whereby a screw driver or similar implement can be utilized for rotating the nut 34.

In the present form of the invention it will be apparent that the positions of the opposed strap members 6 and 6^A will depend entirely upon the curvature of the lens to which they are to be applied, the straps being disposed in various positions as illustrated by the dotted lines in Figure VIII and it will be noted that by having the nut 34 rotatable within the opening in the strap 6^A the position of the stud 12 can be changed to accommodate the strap to the curvature of the lens without affecting the operation of the same.

It will be noted that when the nut 34 is tightened securely onto the end of the stud 12 there is very little possibility of the nut working loose so that the nut will be securely held in position upon the stud 12 and prevents any loosening on the part of the lens.

It will also be noted that by forming the end of the stud with a drilled recess, the stud can be arranged to lock the nuts 18 and 25 in position upon the stud 12 and 22 and prevent any accidental loosening on the part of the nut or the stud and parts carried thereby. In the main form of the invention the sleeve 10 and 10' will be forced apart sufficient to tightly engage the walls of the openings in the lens strap and prevent accidental loss of any of the parts of the mounting. The device in itself is extremely simple in construction and very effective in its operation in that it is securely locked in its position after being fitted onto a lens.

What is claimed is—

A strap for a lens having an opening, said strap including spaced ears, a stud projecting from one of said ears in the direction of the opposite ear, said stud having a tapered portion, a sleeve arranged upon said stud for contacting with the tapered portion, a nut threaded upon the stud for engaging one end of the sleeve, whereby turning movement of the nut will force the sleeve onto the tapered portion spreading the walls of the sleeve against the walls of said opening and securing the parts in such relation and means for locking the parts in attached relation.

E. L. SCHUMACHER.